(12) United States Patent
Takahashi (10) Patent No.: US 11,192,318 B2
(45) Date of Patent: Dec. 7, 2021

(54) TIRE VULCANIZING APPARATUS AND METHOD

(71) Applicant: The Yokohama Rubber Co., LTD., Tokyo (JP)

(72) Inventor: Yukihisa Takahashi, Kanagawa (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 17/278,942

(22) PCT Filed: Jul. 25, 2019

(86) PCT No.: PCT/JP2019/029200
§ 371 (c)(1),
(2) Date: Mar. 23, 2021

(87) PCT Pub. No.: WO2020/075367
PCT Pub. Date: Apr. 16, 2020

(65) Prior Publication Data
US 2021/0308973 A1 Oct. 7, 2021

(30) Foreign Application Priority Data
Oct. 11, 2018 (JP) .............................. JP2018-192231

(51) Int. Cl.
*B29D 30/06* (2006.01)
(52) U.S. Cl.
CPC ..... *B29D 30/0606* (2013.01); *B29D 30/0629* (2013.01); *B29D 2030/0607* (2013.01)

(58) Field of Classification Search
CPC .................... B29D 30/0605; B29D 30/0629
See application file for complete search history.

(56) References Cited

U.S. PATENT DOCUMENTS 3,922,122 A * 11/1975 Bottasso ............ B29D 30/0645
425/46
4,931,004 A * 6/1990 Fogarasi ............ B29D 30/0629
425/28.1
5,492,464 A * 2/1996 Irie .................... B29D 30/0605
425/34.1
(Continued)

FOREIGN PATENT DOCUMENTS

EP       1647383 A1    4/2006
JP       S63-54212 A   3/1988
(Continued)

*Primary Examiner* — James P Mackey
(74) *Attorney, Agent, or Firm* — Thorpe North & Western (57) ABSTRACT

In a tire vulcanization device, a vertical position of a container ring is locked at a closed position by a lock mechanism. A pressurizing mechanism is operated so as to decrease a vertical gap between an upper plate and a lower plate. The lower plate is moved upward so that a segment is moved toward a center mechanism by a container ring and sector molds are assembled in an annular shape. A state where a predetermined vertical gap is formed between the container ring and a bolster plate by a vertical connection mechanism is created. An upper side mold disposed on a lower surface of the upper plate is closed by being pressed against an upper surface of each of the sector molds while maintaining a state where the sector molds are assembled in an annular shape.

9 Claims, 9 Drawing Sheets

(56) References Cited

U.S. PATENT DOCUMENTS

| | | | | |
|---|---|---|---|---|
| 7,314,361 B2* | 1/2008 | Matsumoto | ........... | B29C 33/202 |
| | | | | 425/46 |
| 8,292,606 B2* | 10/2012 | Owen | ................ | B29D 30/0629 |
| | | | | 425/46 |
| 2007/0042065 A1 | 2/2007 | Matsumoto et al. | | |

FOREIGN PATENT DOCUMENTS

| | | |
|---|---|---|
| JP | 10-44156 A | 2/1998 |
| JP | 2003-326534 A | 11/2003 |
| JP | 2005-131985 A | 5/2005 |
| JP | 2013-215945 A | 10/2013 |
| JP | 2018-75728 A | 5/2018 |
| WO | 2005/007376 A1 | 1/2005 |

* cited by examiner

FIG. 9

TIRE VULCANIZING APPARATUS AND METHOD

TECHNICAL FIELD

The present technology relates to a tire vulcanization device and method, and particularly relates to a tire vulcanization device and a method capable of closing a tire vulcanization mold more reliably and manufacturing a tire having excellent quality.

BACKGROUND ART

When manufacturing a tire, a green tire is vulcanized in a closed mold. The sectional type mold is composed of an upper side mold, a lower side mold, and a plurality of sector molds, and the molds are closed so as to be in close contact with each other (see, for example, see Japan Unexamined Patent Publication No. S63-54212).

Each sector mold is pressed toward the center mechanism by a container ring that moves downward and is assembled in an annular shape. Each sector mold assembled in an annular shape and the lower side mold are assembled so as to be in close contact with each other. On the other hand, the upper side mold moves up and down together with an upper plate attached to the upper surface of the upper side mold. When the upper plate is placed below a bolster plate to which the container ring is attached, the upper surface of the upper plate is pressed downward by the bolster plate in the closed state of the mold.

When a gap is created between the sector molds in the closed state, unvulcanized rubber of the green tire disposed in the mold in a sideways state flows out from the gap and the quality of the vulcanized tire is affected. Therefore, in the vulcanization device having this structure, it is necessary to press the sector molds more strongly by the container ring in order to prevent the occurrence of a gap between the sector molds. To achieve this, when closing the mold, the downward movement of the bolster plate must not be restricted by the upper plate and the pressing on each sector mold by the container ring is prioritized over the pressing on the upper plate by the bolster plate.

Accordingly, a gap is likely to occur between the lower surface of the bolster plate and the upper surface of the upper plate. The larger the gap, the greater the amount of the upward movement of the upper side mold together with the upper plate when the green tire receives internal pressure during vulcanization, and a gap is created between the upper surface of each of the sector molds assembled in an annular shape and the lower surface of the upper side mold. In other words, the mold cannot be reliably maintained in a closed state without gaps. As a result, in the vulcanized tire, a step is formed on the upper side portion due to the gap between the upper surface of each of the sector molds and the lower surface of the upper side mold. There is room for improvement in improving the tire quality due to differences in the presence or absence of this step in the upper side portion and the lower side portion of the vulcanized tire.

SUMMARY

The present technology provides a tire vulcanization device and method capable of closing a tire vulcanization mold more reliably and manufacturing a tire having excellent quality.

A tire vulcanization device of the present technology includes: a center mechanism including a vulcanization bladder; a segment attached to an outer circumferential surface of each of a plurality of sector molds arranged in an annular shape around the center mechanism; an upper plate attached to an upper surface of an upper side mold; a lower plate attached to a lower surface of a lower side mold; a container ring arranged on an outer circumferential side of each of the segments; a bolster plate arranged above the upper plate and connected to the container ring; and a pressurizing mechanism for varying a vertical gap between the upper plate and the lower plate, the pressurizing mechanism decreasing the vertical gap whereby the plurality of sector molds are assembled in an annular shape between the upper plate and the lower plate and the plurality of sector molds are vertically sandwiched between the upper side mold and the lower side mold and are closed, the tire vulcanization device further comprising: a vertical connection mechanism that connects the container ring and the bolster plate so as to be separable in a vertical direction; and a lock mechanism that locks a vertical position of the container ring, the pressurizing mechanism being operated so as to decrease the vertical gap in a state where the vertical position of the container ring is locked at a closed position by the lock mechanism whereby the plurality of sector molds are assembled in the annular shape and are closed in a state where a predetermined vertical gap is formed between the container ring and the bolster plate by the vertical connection mechanism.

A tire vulcanization method of the present technology includes: attaching a segment to an outer circumferential surface of each of a plurality of sector molds arranged in an annular shape around a center mechanism including a vulcanization bladder; attaching an upper plate to an upper surface of an upper side mold; attaching a lower plate to a lower surface of a lower side mold; arranging a container ring on an outer circumferential side of each of the segments; arranging a bolster plate connected to the container ring above the upper plate; placing a green tire on the lower side mold in a sideways state; decreasing a vertical gap between the upper plate and the lower plate using a pressurizing mechanism so that the plurality of sector molds are assembled in an annular shape between the upper plate and the lower plate; sandwiching the plurality of sector molds vertically between the upper side mold and the lower side mold so that the green tire is contained therein and the molds are closed; and vulcanizing the green tire by pressurizing and heating the green tire, the container ring and the bolster plate being connected by a vertical connection mechanism so as to be separable in a vertical direction, a vertical position of the container ring being locked at a closed position by a lock mechanism, the pressurizing mechanism being operated so as to decrease the vertical gap so that the plurality of sector molds are assembled in an annular shape, the upper side mold being pressed and closed while maintaining a state in which the upper side mold is assembled in an annular shape on an upper surface of each of the sector molds in a state where a predetermined vertical gap is formed between the container ring and the bolster plate by the vertical connection mechanism.

According to the present technology, since the vertical position of the container ring is locked at a closed position by the lock mechanism, when the pressurizing mechanism is operated so as to decrease a vertical gap between the upper plate and the lower plate when the pressurizing mechanism performs a mold closing operation, the sector molds can be reliably assembled in an annular shape. At this time, since a predetermined vertical gap is formed between the container ring and the bolster plate by the vertical connection mechanism, the upper side mold can be closed by being strongly pressed by the upper surface of each of the sector molds while maintaining a state in which the sector molds are assembled in an annular shape. This is advantageous for ensuring that the mold is closed. Accordingly, a difference in the finish of both side portions of the tire rarely occurs during the vulcanization step, and a tire having excellent quality can be manufactured.

DETAILED DESCRIPTION

Hereinafter, a tire vulcanization device and method of the present technology will be described based on the embodiment illustrated in the figure.

A tire vulcanization device 1 (hereinafter referred to as a vulcanization device 1) of the present technology illustrated in FIGS. 1 and 2 includes a center mechanism 11, a plurality of segments 6, an upper plate 2, a lower plate 4, a container ring 8, a bolster plate 3 connected to the container ring 8, and a pressurizing mechanism 5. Further, the vulcanization device 1 includes a vertical connection mechanism 7 for connecting the container ring 8 and the bolster plate 3 so as to be separable in the vertical direction, and a lock mechanism 9.

A tire vulcanization mold 12 (hereinafter referred to as a mold 12) is attached to the vulcanization device 1. The mold 12 includes an annular upper side mold 12a, an annular lower side mold 12b, and a plurality of sector molds 12c. A green tire T is placed on the lower side mold 12b and disposed in the mold 12 in a sideways state. FIGS. 1 and 2 illustrate a state in which the mold 12 is open.

A center post 11a constituting the center mechanism 11 is arranged at the annular center CL of the upper side mold 12a and the lower side mold 12b. Disc-shaped clamp portions 11c are attached to the center post 11a at intervals in the vertical direction. The upper and lower end portions of a cylindrical vulcanization bladder 11b are gripped by the clamp portions 11c.

The upper surface of the upper side mold 12a is attached to the upper plate 2 so as to face the lower surface thereof.

The upper side mold 12a vulcanizes the upper side portion Su of the green tire T in a sideways state by its lower surface. The upper plate 2 is installed at a predetermined position together with the upper side mold 12a.

The lower surface of the lower side mold 12b is attached to the lower plate 4 so as to face the upper surface thereof. The lower side mold 12b vulcanizes a lower side portion Sd of the green tire T in a sideways state by its upper surface. In this embodiment, the lower plate 4 moves up and down by the pressurizing mechanism 5.

For example, a hydraulic cylinder or the like is used for the pressurizing mechanism 5. When the pressurizing mechanism 5 operates, the vertical gap between the upper plate 2 and the lower plate 4 changes. When the mold 12 is closed, the vertical gap is reduced, and when the mold 12 is opened, the pressurizing mechanism 5 is operated so as to increase the vertical gap.

The segments 6 are arranged in an annular shape around the center mechanism 11 (the center CL). The outer circumferential surface of the sector mold 12c is attached to the inner circumferential side of each of the segments 6 so as to face each other. The outer circumferential surface of each of the segments 6 has an inclination that inclines upward from the outer circumferential side toward the inner circumferential side. The sector mold 12c vulcanizes the tread portion of the green tire T in a sideways state by its inner circumferential surface.

The annular container ring 8 has an annular shape centered on the center mechanism 11 (the center CL), and relatively moves up and down on the outer circumferential side of the segment 6 arranged in an annular shape. As the container ring 8 moves up and down relatively, the inner circumferential inclined surface of the container ring 8 and the outer circumferential inclined surface of each of the segments 6 make sliding contact with each other. Then, the outer circumferential surface of each of the segments 6 is pressed by the inner circumferential surface of the container ring 8 that moves relatively downward, whereby the sector molds 12c move closer to the annular center CL together with the segment 6.

The bolster plate 3 is arranged above the upper plate 2 and is connected to the upper end portion of the container ring 8. The container ring 8 and the bolster plate 3 are connected to each other by the vertical connection mechanism 7 so as to be separable in the vertical direction. A plurality of vertical connection mechanisms 7 are arranged at intervals in the circumferential direction of the container ring 8. For example, three or more and twelve or less vertical connection mechanisms 7 are arranged at equal intervals in the circumferential direction.

In this embodiment, a bolt that engages with the container ring 8 in a state in which the bolt is inserted into a through-hole that penetrates the bolster plate 3 is used as the vertical connection mechanism 7. The vertical connection mechanism 7 can slide in the vertical direction within a predetermined range of the vertical gap g with respect to the bolster plate 3. The vertical gap g is, for example, approximately 0.5 mm or more and 10 mm or less.

In this embodiment, a plurality of engagement portions 8a projecting outward in the radial direction are provided on the outer circumferential surface of the container ring 8 at intervals in the circumferential direction. For example, three or more and twelve or less engagement portions 8a are arranged at equal intervals in the circumferential direction.

The lock mechanism 9 has an engagement portion 9c that engages with the engagement portion 8a described above. In this embodiment, the lock mechanism 9 has an annular body 9A formed in an annular shape along the outer circumferential surface of the container ring 8. A plurality of engagement portions 9c projecting inward in the radial direction are provided on the inner circumferential surface of the annular body 9A at intervals in the circumferential direction. The gap between the engagement portions 9c adjacent to each other in the circumferential direction is a releasing portion 9d.

A plurality of support portions 9B extend downward from an annular body 9A, and each support portion 9B is fixed to the ground base. The annular body 9A is slidably attached to the support portion 9B in the circumferential direction of the annular body in a state where vertical movement is restricted. By rotating the annular body 9A around the center mechanism 11 in the circumferential direction, the lock mechanism 9 can move the engagement portion 9c to a lock position at which the engagement portion 9c overlaps the engagement portion 8a in a vertical direction and an unlock position at which the engagement portion 9c overlaps the releasing portion 9d in a vertical direction.

A configuration of moving the engagement portion 9c to the lock position and the unlock position is not limited to the configuration in which the container ring 8 is fixed in the circumferential direction and the annular body 9A is rotated in the circumferential direction as described above. For example, the engagement portion 9c may be moved to the lock position and the unlock position by rotating the container ring 8 around the center mechanism 11 in the circumferential direction while the annular body 9A is fixed in the circumferential direction. Alternatively, the engagement portion 9c may be moved to the lock position and the unlock position by rotating both the annular body 9A and the container ring 8 in the circumferential direction around the center mechanism 11.

Next, an example of a method of manufacturing a pneumatic tire by vulcanizing the green tire T using this vulcanizing device 1 will be described.

Figure 1:
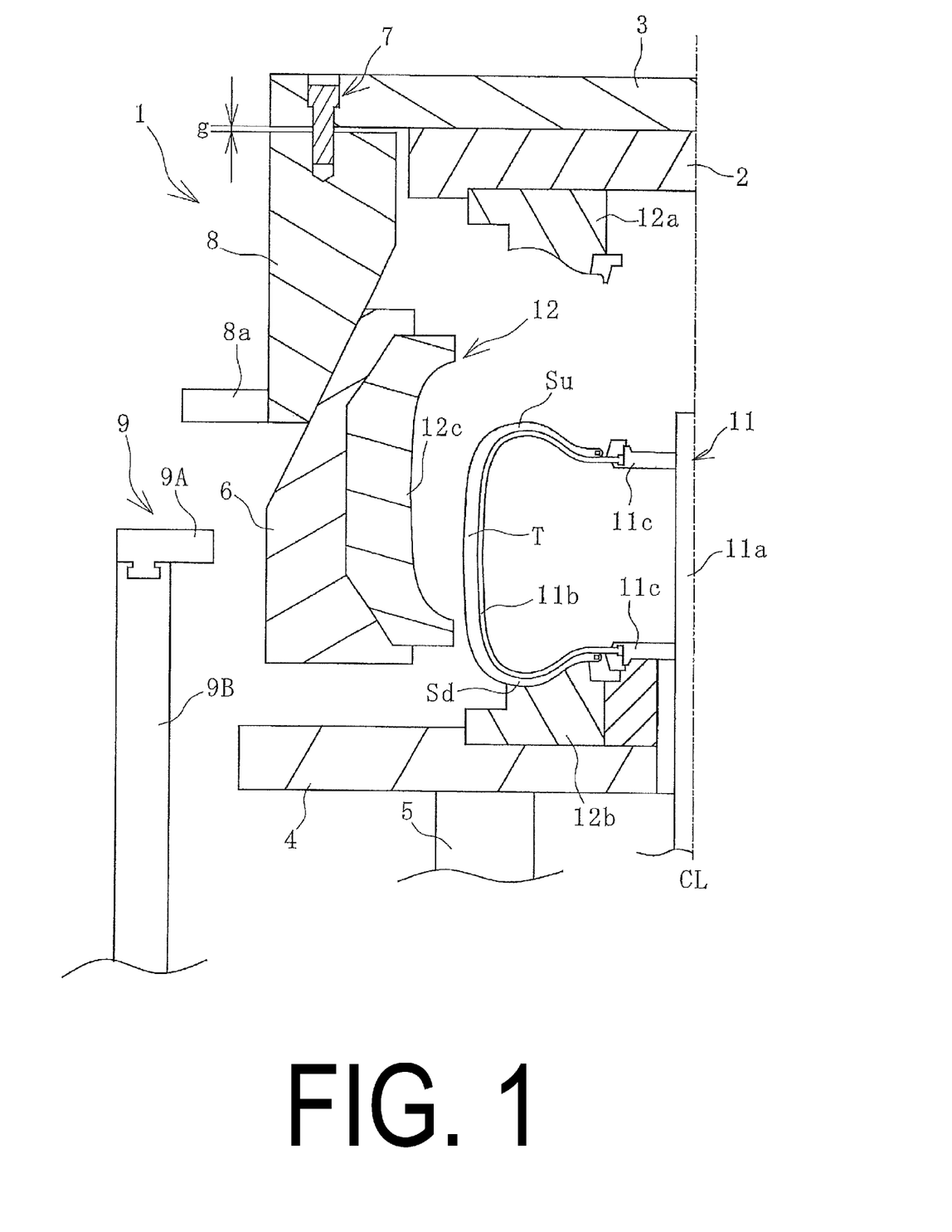
FIG. 1 is an explanatory diagram illustrating the left half of a tire vulcanization device of the present technology in an open state in a vertical cross-sectional view.
Figure 2:
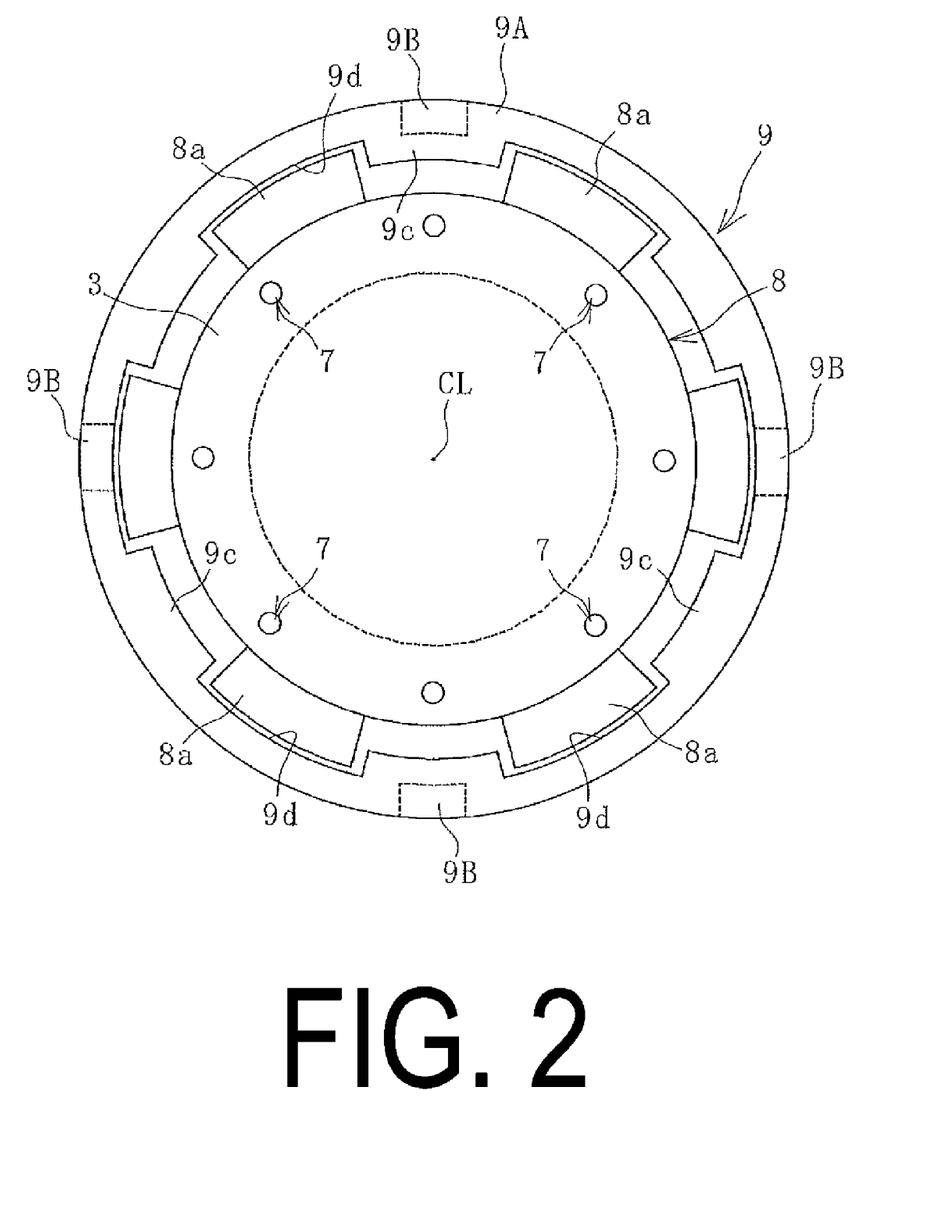
FIG. 2 is an explanatory diagram illustrating a container ring and a lock mechanism of FIG. 1 in a plan view.

When vulcanizing the green tire T, as illustrated in FIG. 1, the green tire T in a sideways state is inserted through the center mechanism 11 with the mold 12 opened, and the green tire T is held by the bladder 11b inflated by the shaping pressure. The green tire T is placed on the lower side mold 12b. At this time, the lower plate 4 is in a state of being stopped at a predetermined standby position.

Subsequently, the bolster plate 3 is moved downward. A predetermined vertical gap g is formed between the bolster plate 3 and the container ring 8 connected by the vertical connection mechanism 7. As illustrated in FIG. 2, since the engagement portion 8a of the container ring 8 is arranged at a position corresponding to the releasing portion 9d, the container ring 8 can be moved downward without the engagement portion 8a interfering with the annular body 9A.

Figure 3:
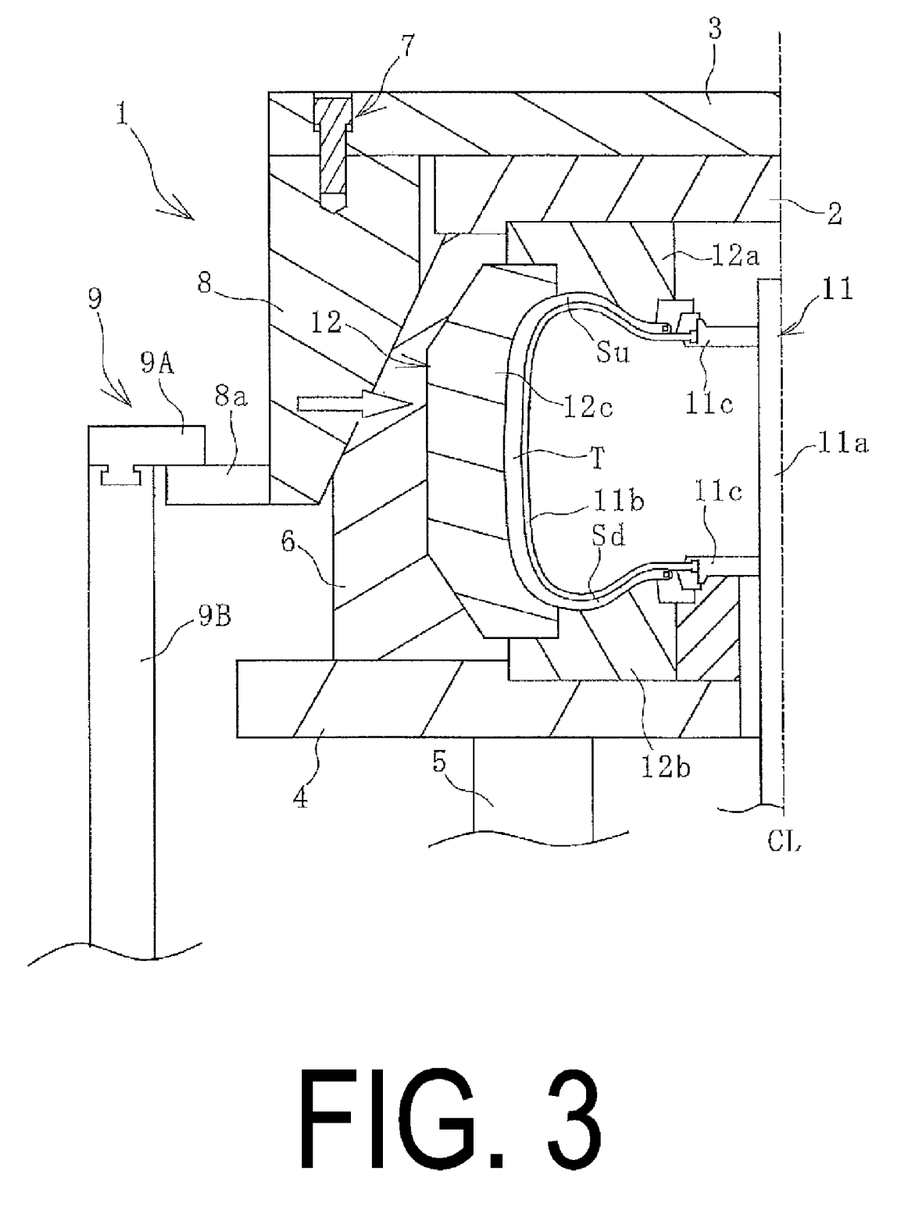
FIG. 3 is an explanatory diagram illustrating a state in which the segment of FIG. 1 is placed on a lower plate and sector molds are assembled in an annular shape in a vertical cross-sectional view.

As illustrated in FIG. 3, each of the segments 6 is placed on the lower plate 4 at a position where the downwardly moving engagement portion 8a passes through the releasing portion 9d and moves up to the lower side of the annular body 9A. Then, the outer circumferential inclined surface of each of the segments 6 is pressed by the inner circumferential inclined surface of the container ring 8 that moves downward, and each of the sector molds 12c is moved toward the annular center CL together with each of the segments 6.

As a result, the respective sector molds 12c are assembled in an annular shape between the upper plate 2 and the lower plate 4. Each of the sector molds 12c assembled in an annular shape is vertically sandwiched between the upper side mold 12a and the lower side mold 12b, and the mold 12 is in a closed state with the green tire T contained therein. At this time, there is no vertical gap g between the bolster plate 3 and the container ring 8, and the facing surfaces of the two are in contact with each other.

Figure 4:
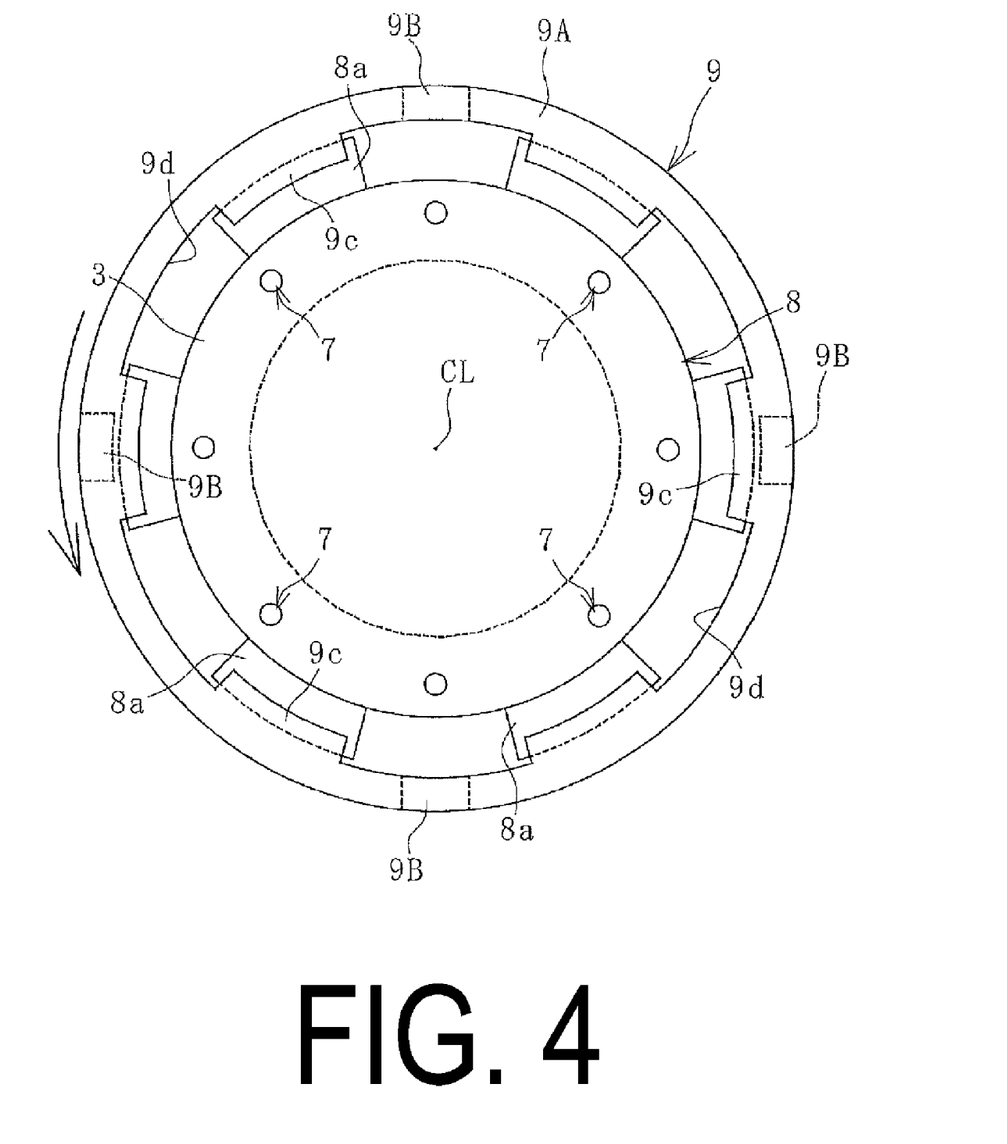
FIG. 4 is an explanatory diagram illustrating a state in which an engagement portion of the lock mechanism of FIG. 3 is moved to a lock position in a plan view.

Subsequently, as illustrated in FIG. 4, the engagement portion 9c is moved to the lock position by rotating the annular body 9A around the center mechanism 11 in the circumferential direction. At the lock position, the engagement portion 9c restricts the upward movement of the engagement portion 8a. As a result, the vertical position of the container ring 8 is locked, and the container ring 8 is maintained at a predetermined closed position.

Figure 5:
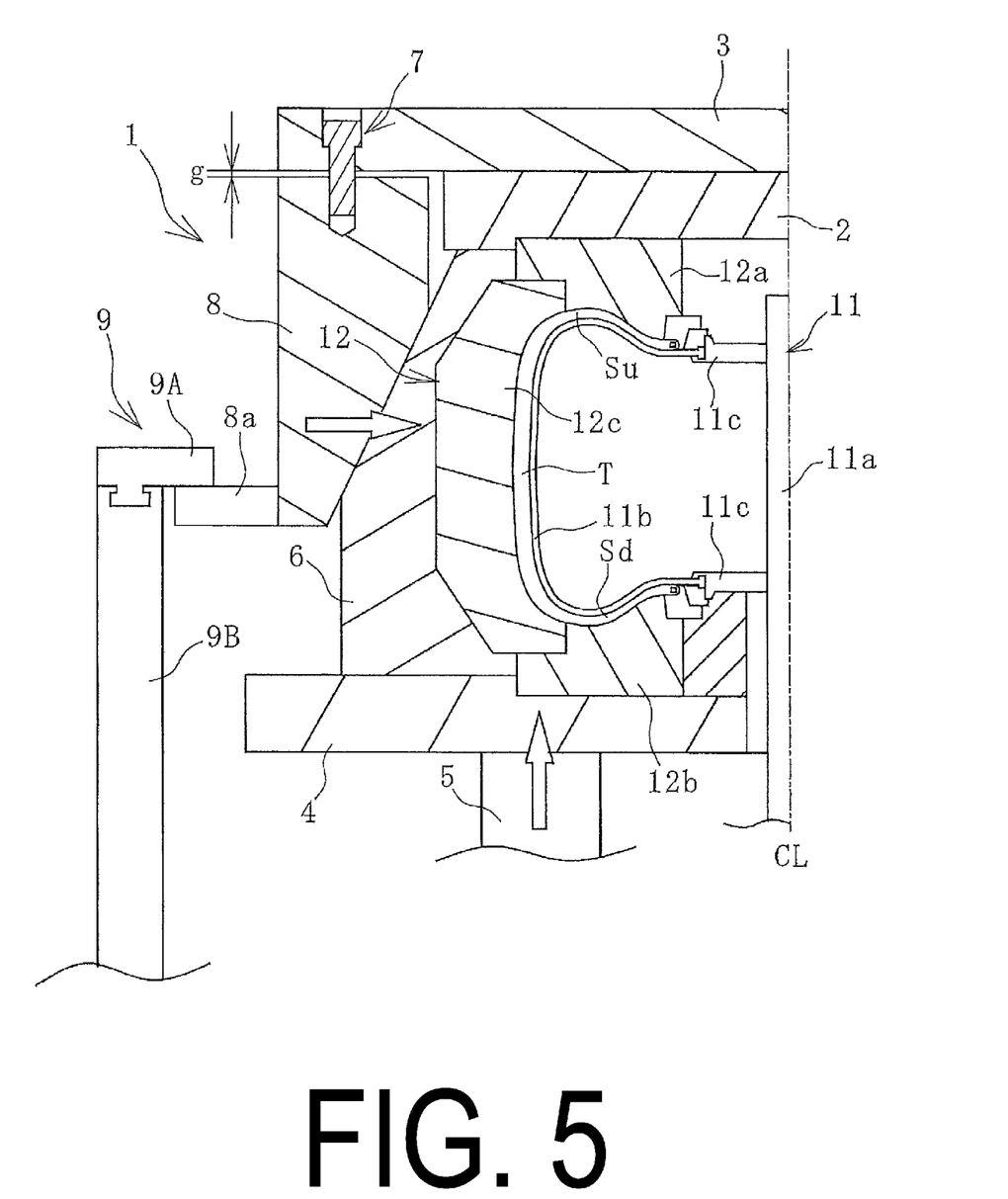
FIG. 5 is an explanatory diagram illustrating a state in which a pressurizing mechanism is operated to close a mold in a vertical cross-sectional view.
Figure 6:
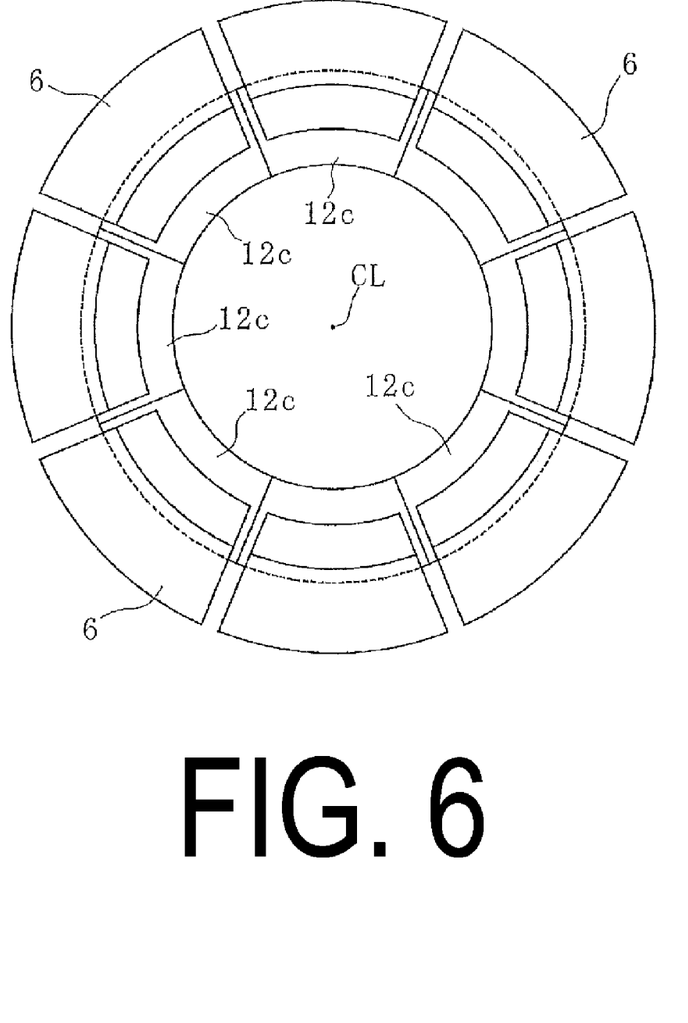
FIG. 6 is an explanatory diagram illustrating the sector mold and the segment of FIG. 5 in a plan view.

Subsequently, as illustrated in FIG. 5, the pressurizing mechanism 5 is operated to move the lower plate 4 upward, and a mold closing operation is performed to reduce the vertical gap between the upper plate 2 and the lower plate 4 to finally close the mold 12. During this closing operation, the vertical position of the container ring 8 is kept locked at the closed position by the lock mechanism 9. Therefore, as illustrated in FIG. 6, the sector molds 12c adjacent to each other in the circumferential direction are assembled so as to be in close contact with each other.

Further, a predetermined vertical gap g is formed between the container ring 8 and the bolster plate 3 by the vertical connection mechanism 7. Therefore, while maintaining the state in which the sector molds 12c are assembled in an annular shape, the upper side mold 12a can be pressed more strongly against the upper surface of each of the sector molds 12c to close the mold. This is advantageous for ensuring that the mold 12 is in a closed state.

In the closed mold 12, the vulcanization bladder 11b is further inflated inside the green tire T to apply a predetermined internal pressure to the green tire T, and the green tire T is heated and vulcanized at a predetermined temperature. A pneumatic tire is obtained by vulcanizing the green tire T for a predetermined time. Since the green tire T is vulcanized in a state where the mold 12 is reliably closed, it is possible to avoid a problem that a step is formed on the upper side portion Su of the manufactured tire. That is, a difference in the finish of both side portions of the tire rarely occurs during the vulcanization step, and a tire having excellent quality can be manufactured.

The lock mechanism 9 is not limited to the above-described configuration, and various configurations that can lock the vertical position of the container ring 8 can be adopted. As illustrated in FIGS. 7A-7B and 8A-8B, a configuration may be adopted in which the engagement portion 9c is moved to the lock position by being moved closer to the center mechanism 11, and is moved to the unlock position by being moved away from the center mechanism 11.

Figure 7A:
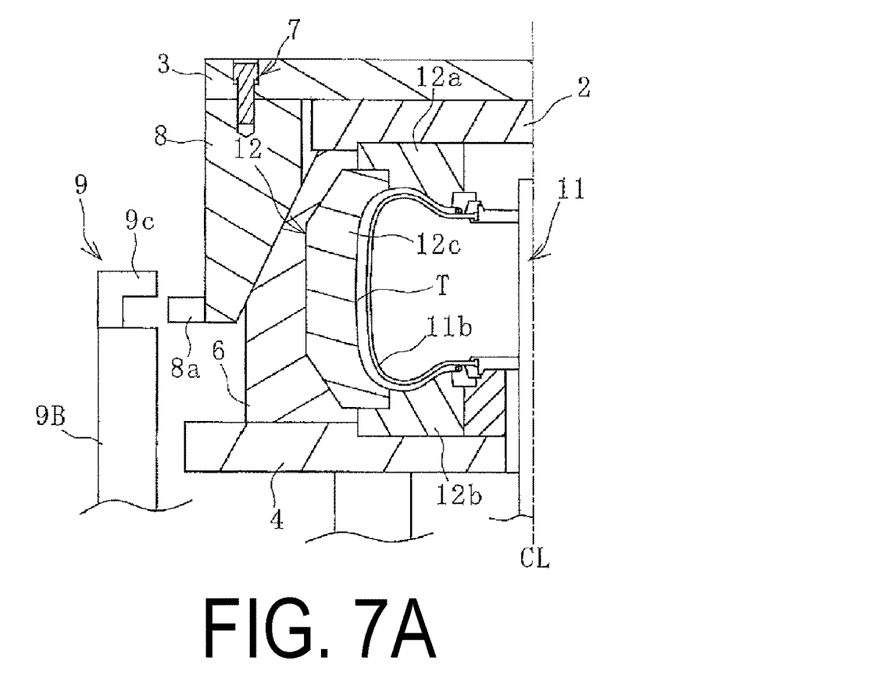
FIGS. 7A-7B are explanatory diagrams illustrating a modified example of the lock mechanism.
Figure 7B:
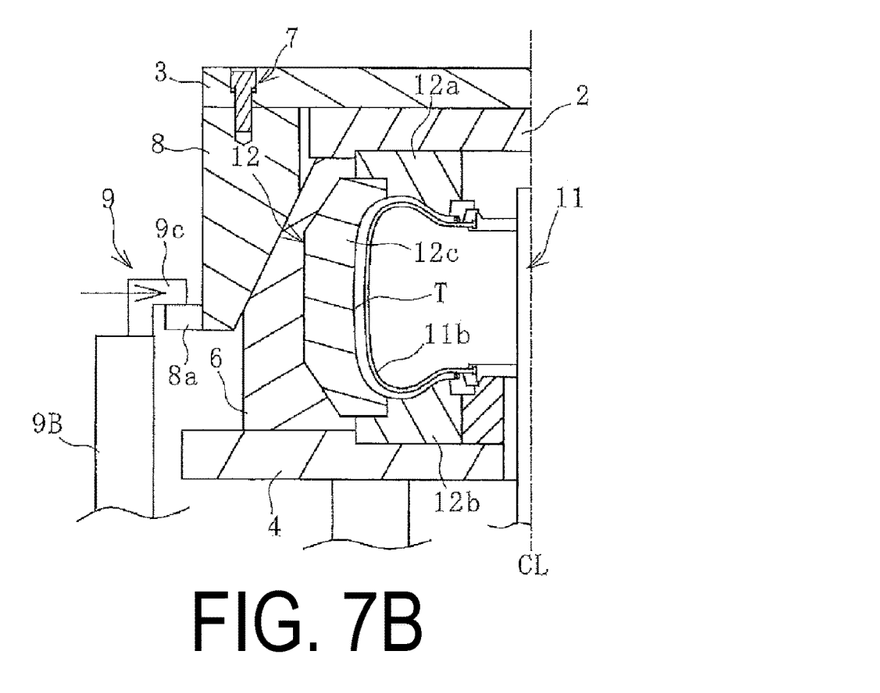

The lock mechanism 9 illustrated in FIGS. 7A-7B has the engagement portion 9c that is supported by the support body 9B and is moved closer to and away from the center mechanism 11. The engagement portion 8a projecting outward in the radial direction is provided on the outer circumferential surface of the container ring 8. The engagement portion 8a may have an annular shape continuous in the circumferential direction of the container ring 8, or may be intermittently arranged in the circumferential direction. By moving the engagement portion 9c away from the center mechanism 11 as illustrated in FIG. 7A, the engagement portion 9c can be moved to the unlock position out of the lock position of overlapping the upper part of the engagement portion 8a. On the other hand, by moving the engagement portion 9c closer to the center mechanism 11 as illustrated in FIG. 7B, the engagement portion 9c can be moved to the lock position of overlapping the upper part of the engagement portion 8a.

Figure 8A:
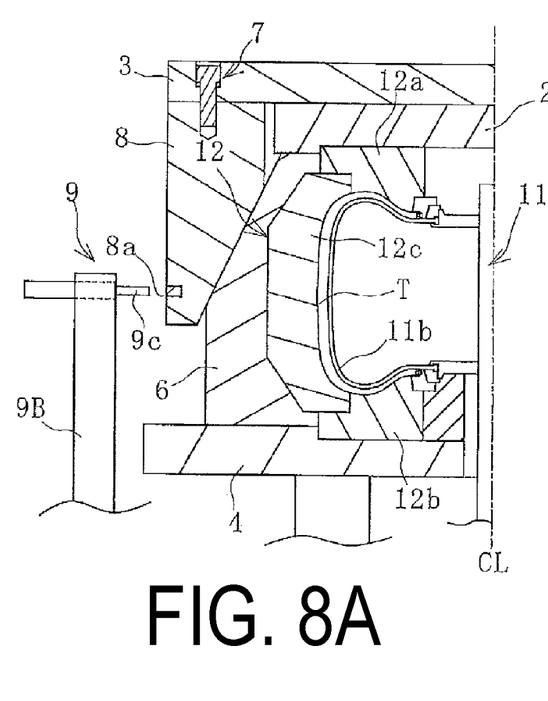
FIGS. 8A-8B are explanatory diagrams illustrating another modified example of the lock mechanism.
Figure 8B:
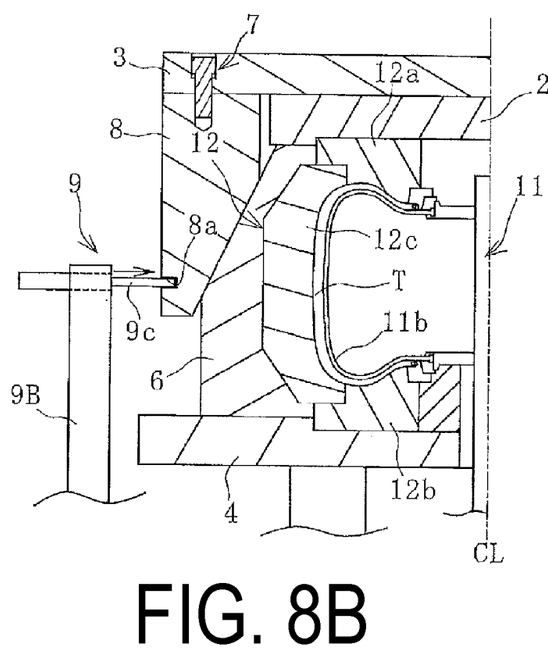

The lock mechanism 9 illustrated in FIGS. 8A-8B has an engagement portion 9c that is supported by a support 9B and moves closer to and away from the center mechanism 11. A plurality of hole-shaped engagement portions 8a arranged at intervals in the circumferential direction are formed on the outer circumferential surface of the container ring 8. By moving the engagement portion 9c away from the center mechanism 11 as illustrated in FIG. 8A, the engagement portion 9c can be moved to the unlock position (the position of being pulled out from the inside of the engagement portion 8a). On the other hand, by moving the engagement portion 9c closer to the center mechanism 11 as illustrated in FIG. 8B, the engagement portion 9c can be moved to the lock position (the position of being inserted inside the engagement portion 8a).

Figure 9:
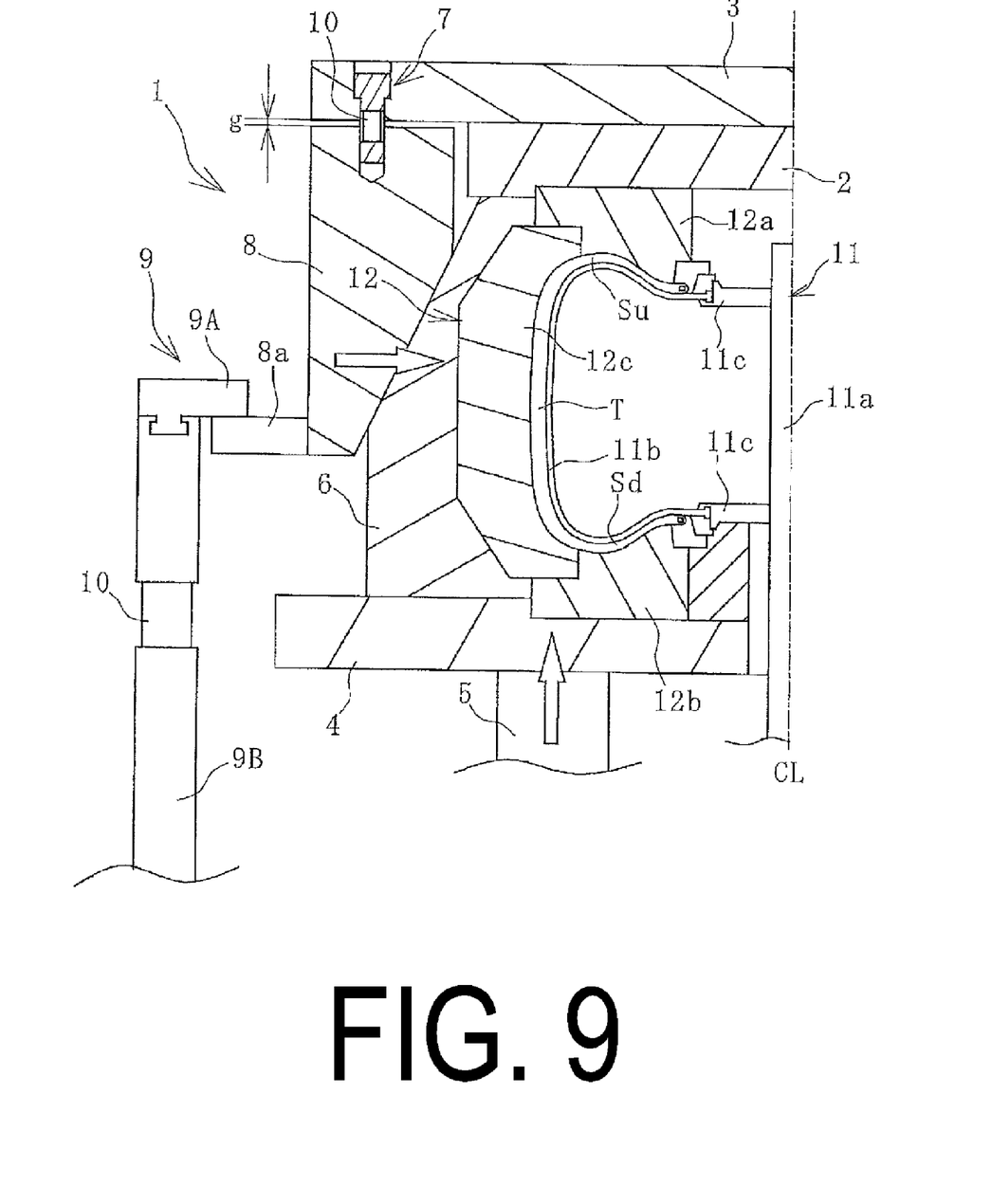
FIG. 9 is explanatory diagram illustrating the left half of another embodiment of the vulcanization device in a vertical cross-sectional view.

The embodiment of the vulcanization device 1 illustrated in FIG. 9 is different from the embodiment in FIG. 1 in that each of the vertical connection mechanism 7 and the support portion 9B is provided with a relaxation mechanism 10, and the other configurations are the same. This relaxation mechanism 10 is a mechanism that relieves a pressing force exceeding a preset allowable range when the pressing force is applied to any one of the sector mold 12c, the upper side mold 12a, and the lower side mold 12b when the mold 12 is closed.

As illustrated in FIG. 5, when the lower plate 4 is moved upward by the pressurizing mechanism 5, if the amount of upward movement of the lower plate 4 is excessive, an excessive pressing force for assembling the sector molds 12 in an annular shape may be applied. When such an excessive pressing force is applied, since the mold 12 is easily damaged, the pressing force is relieved by the relaxation mechanism 10. As the relaxation mechanism 10, for example, a mechanism is used in which, when a pressing force exceeding an allowable range is applied, a stopper that maintains the length of the vertical connection mechanism 7 and the support portion 9B is released and intentionally extended. The allowable range of this pressing force should be determined by conducting a test or the like in advance. The relaxation mechanism 10 may be provided on any one of the vertical connection mechanisms 7 and the support portion 9B.

The invention claimed is:

1. A tire vulcanization device, comprising:
a center mechanism comprising a vulcanization bladder;
a segment attached to an outer circumferential surface of each of a plurality of sector molds arranged in an annular shape around the center mechanism;
an upper plate attached to an upper surface of an upper side mold;
a lower plate attached to a lower surface of a lower side mold;
a container ring arranged on an outer circumferential side of each of the segments;
a bolster plate arranged above the upper plate and connected to the container ring; and
a pressurizing mechanism for varying a vertical gap between the upper plate and the lower plate, the pressurizing mechanism decreasing the vertical gap whereby the plurality of sector molds are assembled in an annular shape between the upper plate and the lower plate and the plurality of sector molds are vertically sandwiched between the upper side mold and the lower side mold and are closed, the tire vulcanization device further comprising:
a vertical connection mechanism that connects the container ring and the bolster plate so as to be separable in a vertical direction; and
a lock mechanism that locks a vertical position of the container ring, the pressurizing mechanism being operated so as to decrease the vertical gap in a state where the vertical position of the container ring is locked at a closed position by the lock mechanism whereby the plurality of sector molds are assembled in the annular shape and are closed in a state where a predetermined vertical gap is formed between the container ring and the bolster plate by the vertical connection mechanism.

2. The tire vulcanization device according to claim 1, wherein the lock mechanism comprises an engagement portion, and the engagement portion is configured to be moved to a lock position for engaging with the container ring and an unlock position for releasing the engagement with the container ring.

3. The tire vulcanization device according to claim 2, wherein at least one of the lock mechanism and the container ring is rotated around the center mechanism whereby the engagement portion is configured to be moved to the lock position and the unlock position.

4. The tire vulcanization device according to claim 2, wherein the engagement portion is arranged at the lock position by moving the engagement portion closer to the center mechanism, and is arranged at the unlock position by moving the engagement portion away from the center mechanism.

5. The tire vulcanization device according to claim 1, further comprising a relaxation mechanism that relieves a pressing force exceeding a preset allowable range when the pressing force is applied to any one of each of the plurality of sector molds, the upper side mold, and the lower side mold when the mold is closed.

6. A tire vulcanization method, comprising:
attaching a segment to an outer circumferential surface of each of a plurality of sector molds arranged in an annular shape around a center mechanism comprising a vulcanization bladder;
attaching an upper plate to an upper surface of an upper side mold;
attaching a lower plate to a lower surface of a lower side mold;
arranging a container ring on an outer circumferential side of each of the segments;
arranging a bolster plate connected to the container ring above the upper plate;
placing a green tire on the lower side mold in a sideways state;
decreasing a vertical gap between the upper plate and the lower plate using a pressurizing mechanism so that the plurality of sector molds are assembled in an annular shape between the upper plate and the lower plate;
sandwiching the plurality of sector molds vertically between the upper side mold and the lower side mold so that the green tire is contained therein and the molds are closed; and
vulcanizing the green tire by pressurizing and heating the green tire,
the container ring and the bolster plate being connected by a vertical connection mechanism so as to be separable in a vertical direction,
a vertical position of the container ring being locked at a closed position by a lock mechanism, the pressurizing mechanism being operated so as to decrease the vertical gap so that the plurality of sector molds are assembled in an annular shape, the upper side mold being pressed and closed while maintaining a state in which the upper side mold is assembled in an annular shape on an upper surface of each of the sector molds in a state where a predetermined vertical gap is formed between the container ring and the bolster plate by the vertical connection mechanism.

7. The tire vulcanization device according to claim 2, further comprising a relaxation mechanism that relieves a pressing force exceeding a preset allowable range when the pressing force is applied to any one of each of the plurality of sector molds, the upper side mold, and the lower side mold when the mold is closed.

8. The tire vulcanization device according to claim 3, further comprising a relaxation mechanism that relieves a pressing force exceeding a preset allowable range when the pressing force is applied to any one of each of the plurality of sector molds, the upper side mold, and the lower side mold when the mold is closed.

9. The tire vulcanization device according to claim 4, further comprising a relaxation mechanism that relieves a pressing force exceeding a preset allowable range when the pressing force is applied to any one of each of the plurality of sector molds, the upper side mold, and the lower side mold when the mold is closed.

* * * * *